United States Patent [19]

Goldstein et al.

[11] 4,349,748

[45] Sep. 14, 1982

[54] TIMER AND POWER CONTROL SYSTEM

[75] Inventors: Richard Goldstein, Northbrook; Louis W. Schornack, Niles, both of Ill.

[73] Assignee: Dynascan Corporation, Chicago, Ill.

[21] Appl. No.: 22,453

[22] Filed: Mar. 21, 1979

[51] Int. Cl.³ .............................................. H01H 43/04
[52] U.S. Cl. ................................ 307/132 E; 307/140; 307/143; 307/157; 315/360; 315/362
[58] Field of Search ..................... 307/116, 141, 141.4, 307/140, 130, 132 E, 143, 157; 340/309.4, 309.5, 309.1; 315/360, 246, 362

[56] References Cited

U.S. PATENT DOCUMENTS

| 3,239,723 | 3/1966 | Washington et al. | 307/130 X |
| 4,002,925 | 1/1977 | Monahan | 307/141 |
| 4,035,661 | 7/1977 | Carlson | 307/141 |
| 4,151,425 | 4/1979 | Cappa | 307/130 |

Primary Examiner—L. T. Hix
Assistant Examiner—Stafford D. Schreyer

[57] ABSTRACT

A timer system includes a power switch operable to power circuit closing and opening conditions, timing means for identifying various timing segments over a 24-hour period and marker storage means having respective power turn on and off marker storage locations assigned to the time intervals encompassing a 24-hour period. An on-off push button or other on-off control operates the power switch and may act as an aid in setting the markers in the storage means. The timer system may also include a rotatable present time setting dial, also adjustable to different positions representing the different time intervals, and a manually operable timer on-off setting member. For real time programming, control means respond to normal operation of the on-off control during a first 24-hour period, initially to set said markers in the storage locations. For fast programming, the control means responds to the successive advancement of said dial from a present time setting through said various positions and the selective operation of the push button or other on-off control to set the markers in the storage locations assigned to the time interval involved, which markers automatically control the operation of the power switch when the timer on-off setting member is in its timer-on position, except when overriden by operation of the on-off control.

38 Claims, 11 Drawing Figures

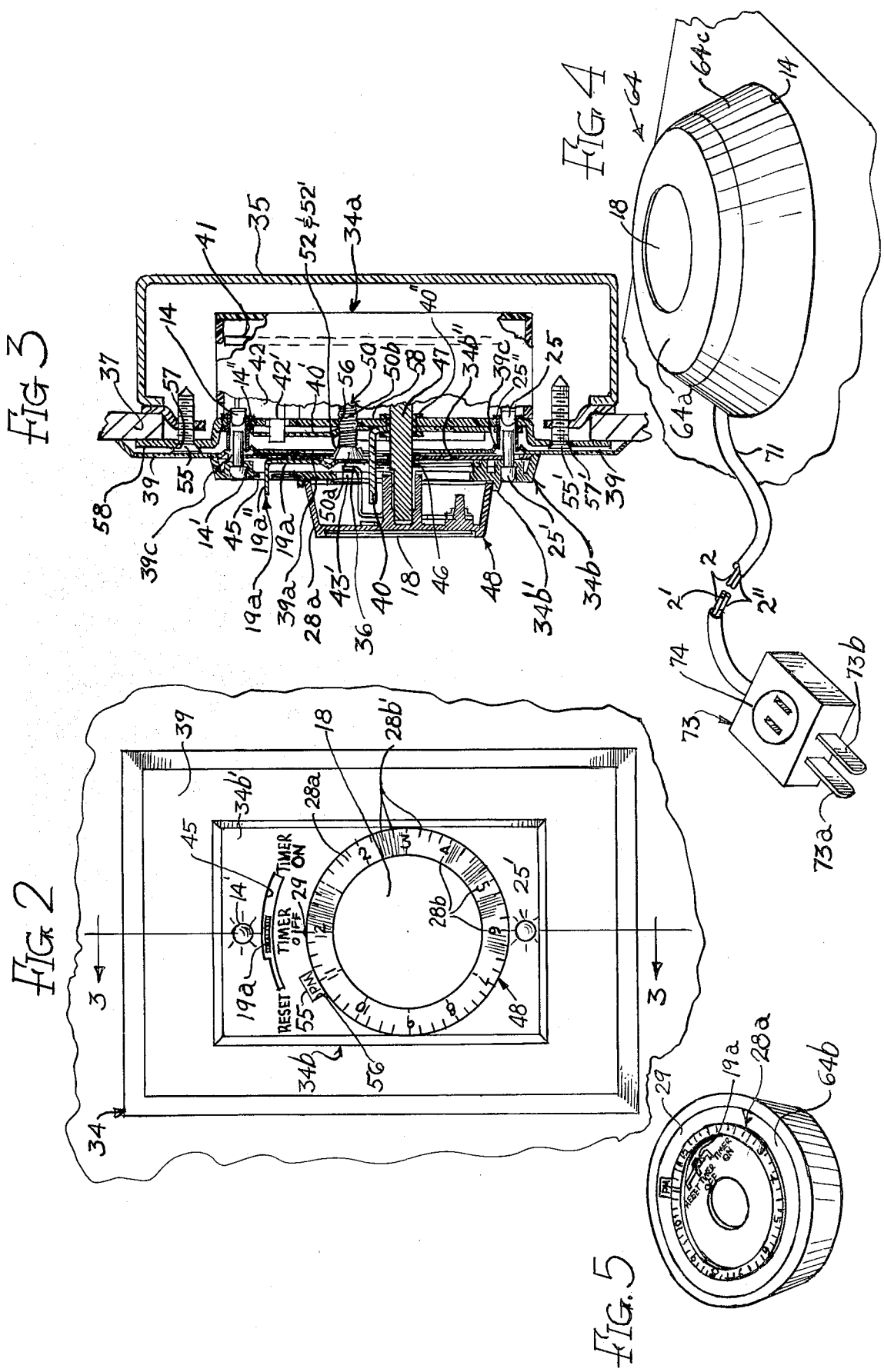

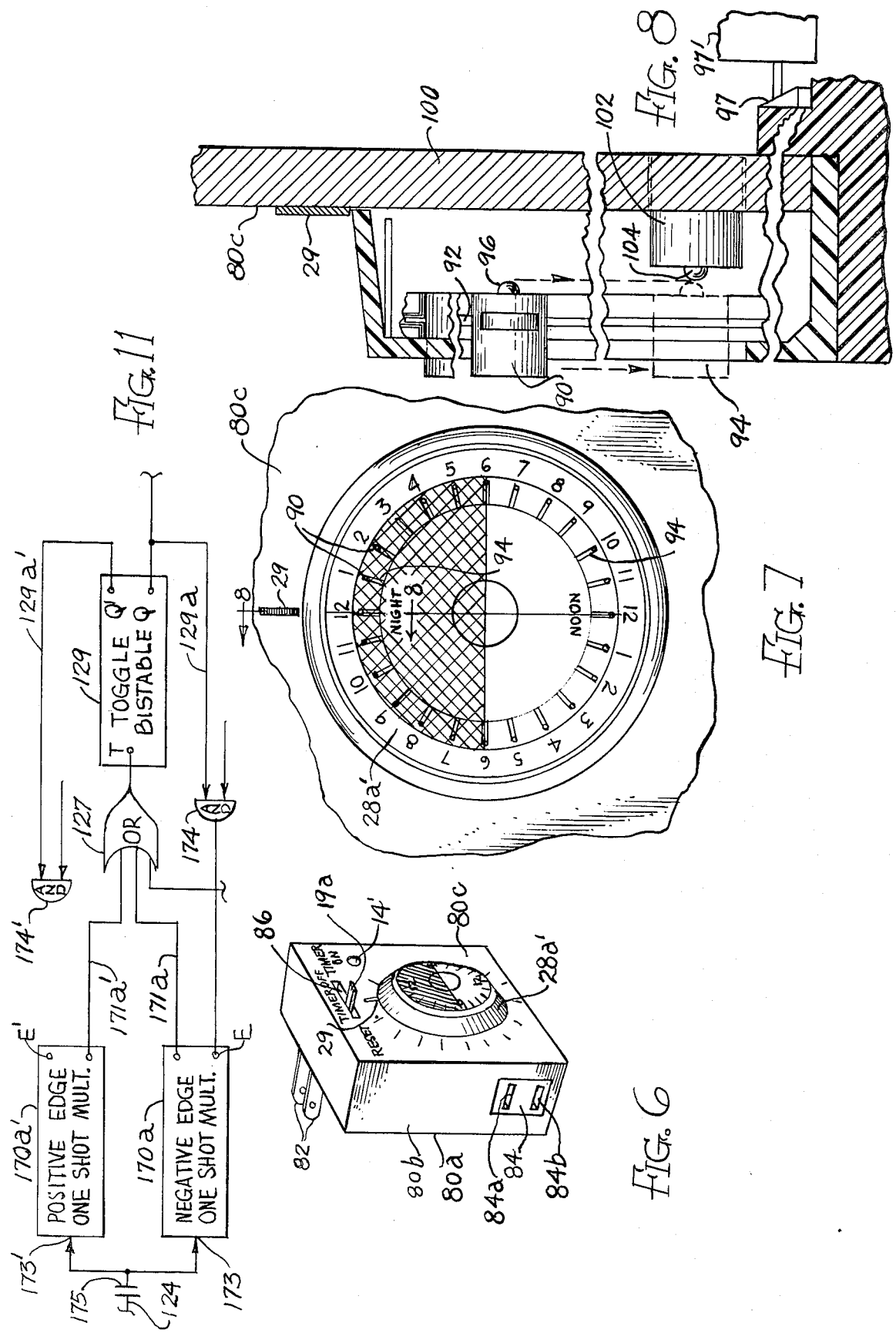

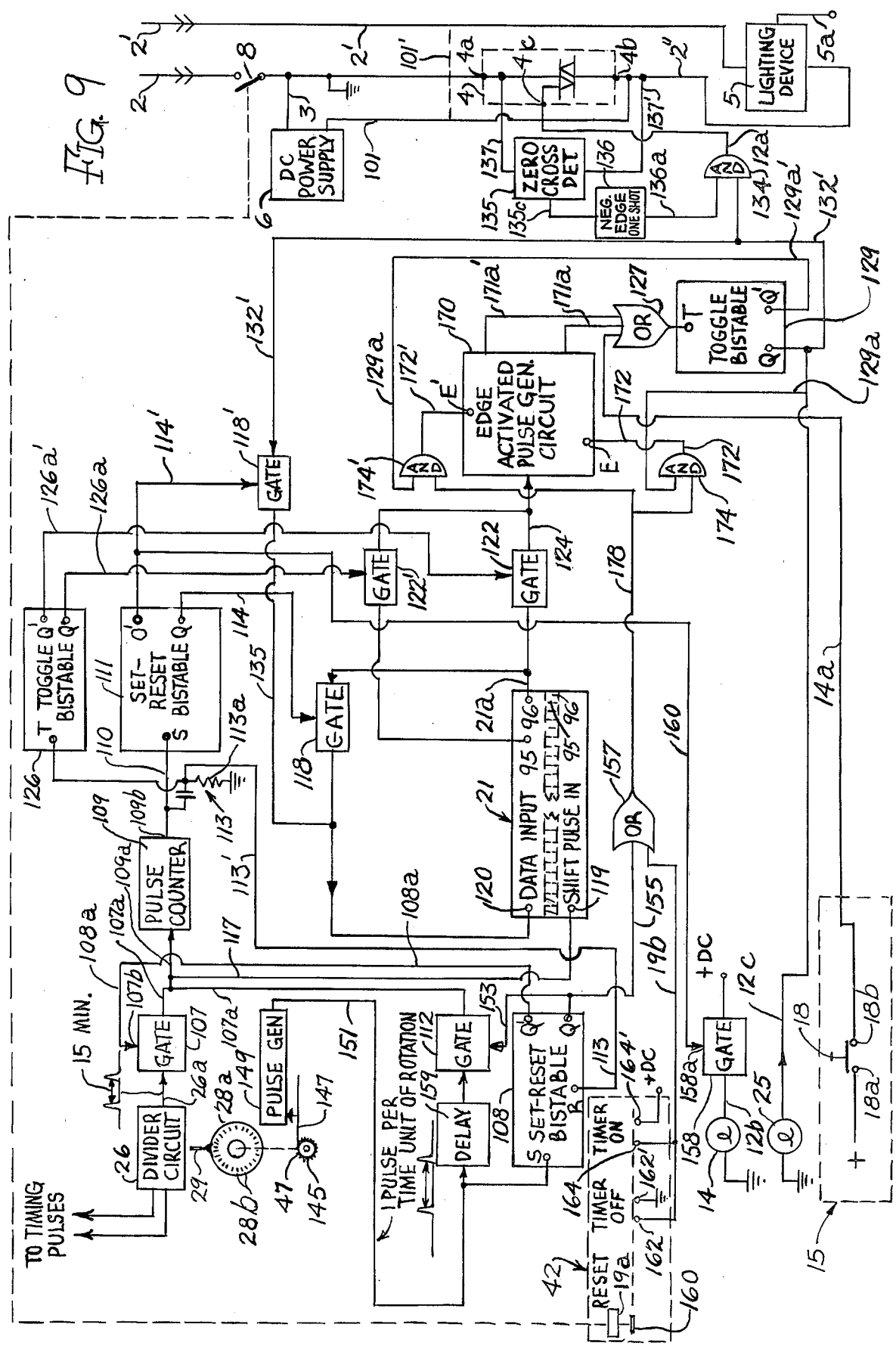

TIMER AND POWER CONTROL SYSTEM

BACKGROUND OF INVENTION

The invention described herein relates to timing devices for electrical power circuits like lighting and appliance circuits in residences. In recent years a large demand for automatic and/or remote control of residential lighting has developed as a result of the increased crime rate involving home invasions. Automatically timed control of lighting has become widely accepted as a significant deterrent for prevention of home invasion. Also, the remote operation of lights, either automatically, from an intrusion alarm system, or from a remote location such as a bedside unit, is a desirable feature of a home protection system.

Automatic light timers commonly available today are motor driven mechanically activated switches. The least expensive type provides a single "on" time selection and a single "off" time selection for each 24 hour period. Some mechanical timers provide for the selection of one hour "on" or "off" intervals that can be arranged in any pattern. The pattern is repeated every 24 hours. The most popular timer type is self contained, with a two-prong plug integral with a housing therefore for directly plugging into the usual houshold electrical outlet. The housing also has an integral socket for plugging in the lamp or appliance to be controlled. Another timer type has a power cord and is designed for setting on the floor or table top. Some manufacturers offer timers for permanent wall mounted installation to control lighting fixtures. To further enhance the usefulness of automatic light timers as a deterrent against home invasions, some timers have a feature that alters the actual "on" time from day to day so that a more probable "lived in" pattern results.

Mechanical motor driven timers have achieved great popularity because of their low cost. However, because of the limitations of mechanical systems, mechanical timers presently in use suffer from a number of disadvantages. Thus, mechanical timers tend to be unreliable and noisy (especially after some period of use), forcing many owners to abandon their use in quiet areas such as studies and bedrooms. Mechanical timers are also large and bulky and therefore have not lent themselves widely to convenient table-top use with "decorator" type styling. The size and bulk of mechanical timers precludes their installation into a flush device electrical box, such as commonly houses wall switches for the control of outdoor or ceiling lighting fixtures.

Inexpensive mechanical timers have "MANUAL/AUTOMATIC" settings on a switch selector. When the timer is in the "AUTOMATIC" mode usually the light cannot be turned on or off without taking the timer out of the "AUTOMATIC" mode. Thus if it is desired to change the light from its present automatically programmed state to the opposite state (ON to OFF or OFF to ON) the user must remember to return to "AUTOMATIC" before leaving the room if he wants programmed control to continue. However, some mechanical timers heretofore developed have an automatic override feature where the automatic control returns to operation automatically when the manual setting and automatic setting subsequently correspond.

It is, accordingly, one of the objects of the invention to provide a timer, which has its most important but not its only application to automatically energize and de-energize home lighting, entertainment equipment or appliance circuits, and wherein the timer is capable of providing a number of "on" and "off" intervals over a twenty-four hour period by electrical control circuitry which may be made in the form of integrated circuits, so that the resulting timer operates quitely and can be made in a very compact and attractive form. A related object of the invention is to provide a timer as just described where it can be incorporated in the small space which usually accommodates a conventional wall switch or in a small enclosure readily plugable into an electric outlet, or can appear as an unobtrusive and attractive component or device settable on a table and connected to an electric outlet through a power cord.

Another object of the invention is to provide a timer as described wherein the control circuitry of the timer is such that when the timer is automatically controlling the energization of the power circuit involved, automatic control thereover can be temporarily overidden by operation of the manually operable switch means which controls the energization of the power circuit when the timer is not in use and which subsequently resumes control when the automatic control setting corresponds to the manual setting.

A still further object of the invention is to provide a timer meeting any one or more of the previously stated objectives of the invention and, furthermore, includes manual controls which enable the timer to be programmed for a wide variety of power "on" or power "off" intervals in such an easy manner that even a young child can program the timer.

Another object of the invention is to provide a timer meeting any one or more of the previously described objectives and wherein the timer memorizes the normal manner in which a given lighting power circuit is energized and de-energized during a normal twenty-four hour period, so that the timer system is more effective in making it appear to potential burglars that the home involved is occupied.

Still another object of the invention is to provide a timer satisfying any one or more, and preferably all of the previously states objectives, and which can be made to sell for a price, in some cases, no more than existing timers not having the advantages of the invention, and in some cases only modestly more than prior timer devices where the timer of the invention includes features not found in the lower priced version thereof.

SUMMARY OF THE INVENTION

The electric timer of the invention is a twenty-four hour repeat cycle timer which may be be constructed to include an enclosure of such small size that it can fit within a conventional flush-device electrical box designed to receive a toggle switch, or an enclosure which can be readily plugged into an electric outlet socket, or can form a small attractive unit settable upon a table or the like. In the case where the enclosure through a power cord plugs into an electric outlet or where it forms a unit settable upon a table or the like, the enclosure includes a socket for receiving the plug of a power cord of the device to be controlled by the timer, such as a table lamp. The enclosure preferably has a manually operable timer on-off setting control, which preferably, although not necessarily, comprises a single control arm movable at least to a timer-on control position and also preferably to a reset position. Within the enclosure is a power switch means, like a triac or the like, operable to power circuit closing and opening conditions. In the case where the enclosure fits into a wall switch opening or is a unit settable upon a table or the like, the enclosure preferably includes a manually operable push button or other control means operable successively to energize and de-energize the power circuit involved in the normal manner, whether or not the timer unit is in a timer-on or timer-off condition. In other words, this push button can override the control of the power circuit timer. In such case, when the timer is functioning, it will be able to automatically control the power circuit once again when the control function to be performed by the timer corresponds to the actual condition of the power circuit involved.

One unique aspect of the invention, which preferably but not necessarily, includes the manual override feature referred to, is the incorporation of a unique programming feature which enables the timer automatically to be programmed over a given 24 hour period by the simple expedient of operating the timer setting control to a program effecting position after the timer has been reset. (The program-effecting position is preferably the aforementioned timer-on position of this control.) For the first 24 hour period, the timer will be automatically programmed to provide a pattern of power circuit energizing and de-energizing intervals corresponding to that produced by the normal operation of the aforementioned push button or other on-off switch utilized normally to energize the power circuit involved. Thereafter, without any further control operation by the user the timer begins its automatic control over the power circuit. In the case where the timer enclosure plugs into an electric outlet socket, the function of the push button just described may be carried out by the particular manually operated control used normally to turn the device to be operated on and off. For example, if this device is a table lamp, the function of the push button previously described is carried out by the pull chain or other manual on-off control of the lamp. In such case, there is provided in the timer enclosure a voltage sensing circuit which senses the presence or absence of the voltage across the load terminals of the triac or other power switch utilized to control the power circuit involved.

The programming feature of the timer just described is sometimes referred to as the real time programming of the timer. Such a programming of the timer is so simple to achieve that even a young child, without knowing it, will be programming the timer during the first 24 hour period, after the timer is reset and prepared for programming. This feature of the invention also has the advantage that, in the case where the timer controls a lighting circuit which is commonly turned on and off a number of times during the nighttime hours, like a kitchen or bathroom lighting power circuit, the more typical pattern of light turn-on and turn-off sequences observed by a potential burglar would more likely make the house appear to the burglar to be occupied, even though the occupants thereof were in fact away on a vacation. This feature of the invention, therefore, substantially increases the effectiveness of the timer of the invention as a burgalry-inhibiting system.

It is also desirable, as in the case of conventional timers, to be able to program the timer quickly. Such a rapid programming of the timer may be achieved, for example, by utilizing a manually operable time setting control preferably for setting a present time and for identifying various different time intervals over a 24 hour period within which the power circuit to be controlled can be selectively energized or de-energized by the timer. In such case, fast programming can be achieved by the simple process of advancing the time setting control from a present time position setting to the different positions thereof representing the different subsequent time intervals to be controlled and operating said push button or other control which turns the controlled device off and on at the beginning of the time interval set by the control. This time setting control, in its most compact, inexpensive and preferred form which makes possible its incorporation in a conventional wall switch opening, a rotatable dial on the outside of the timer enclosure which has on the periphery thereof hour indicating indicia and, where the time intervals are less than one hour in length, markers between such to identify the limits of such smaller time intervals. The rotatable dial may be attached to a depressible and rotatable shaft which when depressed acts as a controlled device turn-on and turn-off means and as a turn-on or turn-off marker setting means for programming the timer.

In accordance with another feature of the invention, for both real time and rapid programming of the timer, an indication is provided that a complete 24 hour timer programming operation is in process. This indication may be supplied by a flashing or steady-state light indication shown on the face of the timer enclosure. Also, during programming, if the controlled device does not include a light which can be seen readily from the position where the programming operation is being effected, such as by operation of a push button, the enclosure upon which the push button is located may include a differently colored light which turns on and off when the push button is operated to effect rapid programming of the timer.

In both the real time and fast time programming features of the invention, the programming function sets said power turn-on and power turn-off markers in appropriate storage locations of a storage means which contains storage locations corresponding in number to the number of time intervals in a twenty-four hour period to be individually controlled by the timer. While such storage means may comprise a random access storage system, such a system is definitely not desirable in the interest of the desired low-cost of a residential timer, which must sell at a relatively low retail cost, while permitting a reasonable profit margin for the manufacturer, distributor and retailer. Thus, in accordance with another aspect of the invention, a twenty-four hour repeat cycle, continuously recirculating shift register is uniquely used to store patterns of power turn-on and turn-off markers corresponding to the desired power circuit energizing and de-energizing conditions over the timing intervals encompassing the basic 24 hour programming period. While shift registers have been heretofore utilized for the storage of power turn-on and turn-off markers to control the points at which a power circuit is changed between energized and de-energized conditions (see U.S. Pat. No. 4,035,661 to Carlson), such shift register power circuit control systems are programmed and used in a substantially different way from the invention which is far less costly to manufacture and performs many functions not disclosed or contemplated by such systems. For example, the shift register power circuit control system disclosed in the Carlson patent is not a twenty-four hour repeat cycle timer and includes a visual readout means which identifies a particular time interval represented by the shift register stage in position to receive a power turn-on or turn-off marker along with addressing means for shifting the markers in the shift register into an appropriate position to receive a marker for the time interval identified by the readout means. The components and logic circuitry necessary to program and access such a shift register system substantially increases the complexity and cost of the manufacture of such a timer in comparison to the preferred form of the present invention. Thus, in accordance with another aspect of the invention, in both the real time and fast programming of the timer the programming is all related to a present time. Thus, in real time programming the timer is reset at present time so that the pattern of markers set into the continuously recirculating repeat cycle shift register automatically during the next twenty-four hours need not require any readout or special addressing. For fast time programming, a present time setting is immediately followed by the fast programming operation effected in a time less than the basic timing interval (like 15 minutes) which can be programmed. The markers so set are then recirculated during each subsequent twenty-four period independently of whether or not the timer is in a timer-on or timer-off condition and independently of whether or not the timer is overridden by operation by a manually operable power turn-on or turn-off control.

The above and other objectives, advantages and features of the invention will be understood after making reference to the specification and claims to follow, and the drawings.

DESCRIPTION OF DRAWINGS

FIG. 2 is an elevational view of a wall switch embodiment of the invention, the light timer system there shown being incorporated into an enclosure assembly which fits into a conventional wall switch opening;

FIG. 3 is a sectional view of the timer system illustrated in FIG. 2, when mounted in a wall switch opening, as seen along section line 3—3 in FIG. 3;

FIG. 4 is a perspective view of another form of the invention wherein the timer system is incorporated into an enclosure resting on the top of a table, and connected to a wall socket outlet through a power cord;

FIG. 5 is a bottom perspective view of the enclosure shown in FIG. 4;

FIG. 6 is a perspective view of another form of the invention wherein the timer system is incorporated into an enclosure which plugs directly into an electric wall outlet socket;

FIG. 7 is an elevational view of the time setting dial located on one face of the enclosure shown in FIG. 6;

FIG. 8 is an enlarged fragmentary sectional view through the time setting dial shown in FIG. 7, taken along section line 8—8 therein;

FIG. 9 is a block diagram showing the basic electrical control circuit responding to the various manually operable controls for the forms of the invention shown in FIGS. 2-5;

FIG. 11 is an exemplary block diagram for the edge activated pulse generator circuit shown as one block in FIG. 9.

DESCRIPTION OF EXEMPLARY EMBODIMENT OF THE INVENTION SHOWN IN DRAWINGS

Figures 1, 10:
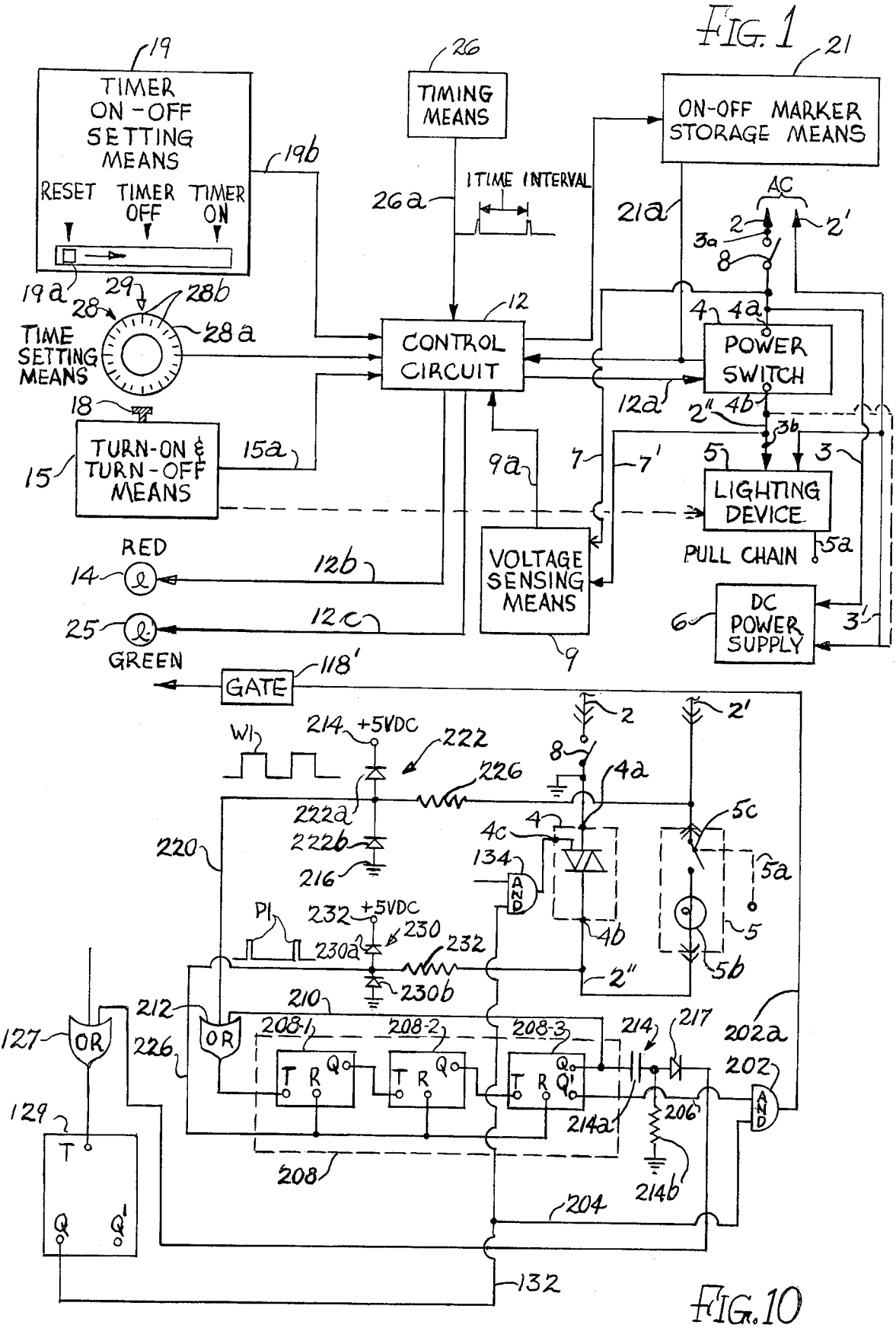
FIG. 1 is a basic block diagram illustrating the timer system of the invention which includes various manually operable controls and control units responsive thereto.
FIG. 10 is a block diagram of modified portion of the block diagram of FIG. 9 required for the form of the invention shown in FIGS. 7 and 8.

Referring now more particularly to FIG. 1, the exemplary timer system there shown may be connected by the terminals of a plug connector (not shown) to AC power lines 2—2'. Conductors 3—3', are shown extending from the AC input lines 2—2' to a DC power supply means 6 which converts AC to DC used to energize the various electrical circuits identified more fully in FIGS. 9-11 to be described later on in the specifications. A power switch 4, which may be a triac, has its load terminals 4a-4b connected between a timer power input terminal 3a and a load device connecting terminal 3b of the timer portion of the system. The power input terminal 3a is connected through a power on-off switch 8 to power line 2. The load device connecting terminal 3b is connected through a conductor 2" to one terminal of a device 5 to be controlled, shown as a lighting device. For example, if the lighting device 5 is a table lamp, there could be a pull chain 5a connected to a switch (not shown) which connects the other power line 2' and an incandescent lamp or other light source to conductor 2" when the switch is closed.

In the case where the lighting device 5 is to be turned on and off by its own pull chain 5a or other on-off control in accordance with the present invention, a voltage sensing circuit 9 is connected by conductors 7—7' across the triac load terminals 4a-4b.

The voltage sensing circuit 9 is a circuit which responds to the voltage conditions across the triac main or load terminals 4a-4b during the successive operation of the pull chain 5a or other on-off control of the lighting device 5 by providing control signals on output conductor means 9a extending to the control circuit 12 which renders the power switch 4 conductive or non-conductive state as called for by its operation of pull chain 5a. When the control circuit is to render the power switch conductive, trigger pulses appear each half cycle on a control circuit output line 12a extending to a gate or control terminal 4c of the power switch which causes the power switch to be conductive each half cycle as the applied AC voltage reaches a threshold voltage (usually about 5 volts). When the triac is to be nonconductive, the trigger pulses disappear from the output line 12a.

In the case where the timer system of the invention is incorporated into an enclosure fitted into a wall switch opening or settable on the top of a table, the controlled device 5 involved is normally controlled by a separate turn-on and turn-off control means 15 including a push button 18. The successive depression of the push button 18 successively operates the power switch 4 between the conductive and non-conductive states. The turn-on and turn-off means 15 is shown connected by conductor means 15a (a single line in FIG. 1 sometimes representing a pair of conductors) to control circuit 12 so that the push button 18 operates the control circuit in the same manner as the control signals on line 9a of voltage sensing means 9 operates the same.

The timer system shown in FIG. 1 has a manually operable timer on-off setting means 19 which sets the timer system into either a TIMER-OFF or TIMER-ON mode of operation. As illustrated, this setting means includes a manually operable arm 19a which is settable from an initial RESET position, where all of the control circuits to be described are reset to a reference condition, to either a TIMER-ON or TIMER-OFF position. The RESET position of arm 19a may also open a main power on-off switch 8 which controls the input power to the entire timer system. Output conductor means 19b extend from the setting means to the control circuit 12. Control signals appear on output conductor means 19b which identify to the control circuit 12 the position of the timer-on and timer-off setting means 19. When this setting means is set to a TIMER-OFF condition, the lighting device 5 is operated in a normal manner by the pull chain 5a or push button 18. When the setting means 19 is in its TIMER-ON condition, the control circuit 12 will operate the power switch 4 in accordance with programming information stored in an on-off marker storage means 21. The marker storage means 21 has a number of storage locations in which timer-on and timer-off markers can be stored indicating the particular time interval or intervals of a 24 hour period during which the control device 5 is to be selectively automatically energized and de-energized. The "markers" can be binary digits "1" and "0" stored in individual stages of a shift register in the most preferred and advantageous form of the invention. However, in accordance with a much less preferred but possible form of the invention, these markers can be other informational data in the storage locations of a random access memory unit. The storage means 21 has a data output line 21a extending to the control circuit 12. Power switch operating signals on line 21a derived from the markers stored in the storage means 21 effect operation of the power switch 4 when the timer is operating in its TIMER-ON mode of operation.

Programming of the invention (i.e., the process of inserting markers in the storage locations of the marker storage means 21) can be effected in the most preferred forms of the invention in two different ways, one being a fast programming and the other way being a real time programming of the timer system. The real time programming of the timer system is effected by simply operating setting means 19 first to its RESET condition and then operating the same to the TIMER-ON or TIMER-OFF condition. In either case, when the setting means is operated from its RESET condition to whatever condition or conditions effect programming for the first 24 hour period thereafter, an on or off marker is set automatically in the storage location of the storage means 21 identifying each time interval over their first 24 hour operating period of the timer system in accordance with the operation of the manually on-off control (18 or 18a) during each time interval. Thereafter, no programming can take place until the setting means 19 is returned to its RESET condition. The fact that the timer is in the process of being programmed (i.e., the first 24 hour period of the timer system operation after movement of the control arm 19a from its RESET to a programming position) is indicated by energization of a lamp 14. After this 24 hour programming period has terminated, the lamp 14 (which may be a red light source) is de-energized. FIG. 1 shows control circuit output conductor means 12b extending between control circuit 12 and red light source 14 to control the same in this manner.

Fast programming of the timer system is made possible by a time setting means 28, which can take a number of forms. In all of these forms, it is preferred that the time setting means includes a rotatable dial 28a settable to a present time indication. In FIG. 1, the dial 28a has at its periphery hour-indicating indicia and markers 28b.

A normally stationary reference index mark 29 is located just beyond the dial periphery so that the dial can be rotated to bring the indicia and mark 28b thereof indicating the present time opposite the reference index mark 29. Also, it is preferred that the periphery of the dial 28a have smaller time intervals like 15 minute markers. An individual timing pulse identifying the beginning of each programmable time interval is generated by the time setting dial 28a as it is rotated the distance to bring a new 15 minute marker opposite the reference index mark 29. An on or off marker is then set in the appropriate storage location of the storage means corresponding to the then actual operating condition of the controlled device 5. If there is to be a change in the energizing condition of the controlled device from that desired for the previous timing interval, then the on-off control 18 or 5a involved is operated to change this condition.

In the other form of time setting means, the dial 28a has a radially movable control (see FIG. 7) opposite certain time interval markers on the periphery of the dial, and each control is operable to one extreme position or the other representing an on-marker or off-marker generating position. When each time interval marker of the dial is moved past the reference index marker 29, a programming voltage is generated which sets the power on or off marker in the storage location of the storage means 21 assigned to the time interval involved.

To give the operator an indication of the on or off marker setting operation being made, a green indicating light 25 may be provided which is energized when the programming operation being effected for a time interval is an "on" marker setting operation. FIG. 1 shows control output conductor means 12c extending from the control circuit 12 to the green light 25.

The storage of markers and the identification of the various time intervals which can be individually programmed is made by a timing means 26 which produces on an output conductor means 26a thereof timing pulses which are spaced apart by the duration of the basic programmable time interval, 15 minutes in one example of the invention being described. The output conductor 26a is shown extending to the control circuit 12.

When the timer on-off setting means 19 is operated to a TIMER-OFF condition and the timer system has been programmed, operation of the push button 18 or the on-off control 5a of the lighting or other controlled device 5 will successively energize and de-energize the same as described and the controlled device 5 will not be automatically controlled. When, however, the push button 18 or on-off control 5a is operated while the timer on-off setting means 19 is set to the TIMER-ON condition, these controls will override the control function called for by the marker in the storage location of the storage means 21 assigned to the time interval involved, until the operating condition of the controlled device called for by such marker corresponds to the actual condition of the controlled device.

While in accordance with the broadest aspect of the invention the timer system shown in FIG. 1 and just described may take a number of different forms, it preferably may take three basically different forms to be described, the selection of which depends upon the desires of the user thereof. Reference should now be made to FIGS. 2 and 3 which illustrate a form of the timer system of the invention wherein various of the components shown in FIG. 1 are incorporated on and within an enclosure assembly generally indicated by reference numeral 34 which fits over and into a conventional flush-device electrical box 35 and controls internally wires power circuits, like ceiling lights. The rear portion 34a of the enclosure assembly 34 is shown as a plastic box opening onto the forwardly face side thereof and fits into the flush-device electrical box 35. The box may contain a printed circuit board 41 supporting most of the components of the timer system. This wall switch opening is covered by a conventional wall switch plate 39 which has the usual central vertical slot 39a and upper and lower circular openings 39c—39c' which normally receive anchoring screws. However, in the form of the invention shown in FIGS. 2 and 3, no such screws are associated with these openings. Rather, light projecting lens units 14' and 25' respectively pass through these openings and are in respective alignment with said lamps 14 and 25, supported on chassis 41 contained within the box 34a. The lens units 14' and 25' respectively provide red and green light indications visible from the front of the timer when the lamps 14 and 25 are energized. These lamps may be incandescent lamps, light-emitting diodes or the like.

The enclosure assembly 34 includes a front sub-assembly 34b including a front wall 34b' having a large central opening 43' and a rear wall 34b'' which forms with the front wall 34b' a space for gearing (only a drive gear 36 being shown) and the vertical portion 19a' of a control arm 19a of the previously described timer on-off setting means 19. The control arm 19a has a horizontal portion 19a'' passing through a horizontally elongated opening 45 in the front wall 34b'. The vertical portion 19a' of the control arm 19a is rotatably mounted upon the cylindrical portion of a horizontal switch-operating shaft 47 through a cylindrical eyelet 46. The shaft 47 projects through the front enclosure wall opening 43' and the vertical slot 39a in the wall switch plate 39. The front end of the shaft 47 frictionally receives a combination push button and time-setting knob 48 which is spring urged to an outer position. The vertical portion 19a' of the control arm 19a engages a horizontally extending switch control arm 40 passing through the wall switch plate slot 39a and extending from a vertical switch operating plate 40' located behind the wall switch plate 39. The plate 40' is rotatably mounted upon the shaft 47 through a cylindrical eyelet 40'' which secures the plate 40' to a heat sink strip 58. When the control arm 19a is moved between its RESET, TIMER-OFF and TIMER-ON positions shown in FIG. 2, this motion is communicated to the control plate 40'. The control plate 40' engages a switch-operating arm 42' associated with a switch 42, the electrical portions of which will be described in connection with the block diagram of FIG. 9.

The control knob 48 illustrated forms both the push button 18 and time-setting dial 28a shown in FIG. 1. Thus the central portion 18 of the knob 48 forms the aforementioned push button 18, and an inclined peripheral side wall 28a thereof forms a time-setting dial having 12 hour-identifying markers and indicia 28b on the periphery thereof and intervening 15-minute time interval markers 28b' positioned therebetween. A reference index mark 29 is positioned on the enclosure sub-assembly front wall 34b' adjacent to the periphery of the control knob so that the time interval markers 28b–28b' can be aligned with the reference index mark 29 for setting present time. The drive gear 36 is attached to and is rotated by the shaft 47, and one revolution of the shaft shifts the position of an A.M.-P.M. indicating plate 55 (FIG. 2) visible in an opening 56 in the front wall 34b' to indicate whether the time set is A.M. or P.M. time. Also, this gearing may include a ratchet means (not shown) permitting the shaft 47 to rotate in only one direction. The shaft 47 extends to switch means on the chassis 41 which, when the knob 48 is pushed momentarily inwardly, generates a control pulse. This switch means also includes a switch section which, when as the shaft 47 is moved 1/48th of a revolution, also generates a control pulse.

The front enclosure sub-assembly 34b is anchored in place by a screw 50 having a head portion 50a bearing against the defining walls 52 of an opening 52' in rear wall 34b''. Removal of knob 48 from shaft 47 exposes the screw 50. The threaded shank 50b of screw 50 threads into an opening 56 in heat sink strip 58 behind wall switch plate 39. The wall switch plate 39 is anchored in position by the tightening of the screw 50. The heat sink strip 58 is shown anchored to wall 37 by screws 55-55' passing respectively through openings 57-57' into threaded holes in the flush-device electrical box 35. Lens units 14' and 25' are anchored in subassembly 34 and fit into switch plate openings 39c-39c' and openings in positioning tubes 14'' and 25'' carried by a heat sink strip 58, which key the same into a fixed position. The lamps 14 and 25 extend into the tubes 14'' and 25''.

The timer system of FIGS. 2 and 3 operates in the same manner as described in connection with the previous description of FIG. 1. For rapid programming, the control arm 19a is moved to its RESET position to reset all of the resettable control circuits to be described in connection with FIGS. 9-11. Then the control arm 19a is moved to its TIMER-ON or TIMER-OFF position. For rapid programming, while the control arm 19a is in its RESET position, the dial 28a is rotated to set present time by bringing the appropriate marker 28b or 28b' to the reference index marker 29 for the A.M. or P.M. time involved. The control arm 19a is then set to either its TIMER-OFF or TIMER-ON position. A red light indication will appear at the upper lens unit 14', indicating that the timer programming is in progress and must be completed before the timer system can be used. If it is desired that the lighting or other power circuit to be controlled automatically by the timer be energized at the present time setting of the control knob 48, the operator will depress the push button portion 18 of the control knob 48. This will cause both the controlled power circuit and green light 25 to become energized. If it is desired that the power circuit be de-energized during present time, the push button portion 18 of the control knob 48 will not be depressed. In either event, to complete a rapid programming operation, the control knob 48, which is made rotatable in only a counterclockwise direction, is then rotated to bring the markers 28b–28b' to the reference index mark 29 which represents the time when a change in the condition of the power circuit is desired. The push button portion 18 of the control knob is then depressed. Control knob 48 is further rotated and the push button portion 18 of the control knob 48 is operated in a manner to cause the green light 25 to turn on and off in the manner desired for the various time interval markers 28b–28b' brought to the reference index marker 29 until the control knob 48 has been rotated to the initial present time position. This will de-energize red light 14 to indicate the completion of a rapid programming operation.

For real time programming, the control arm 19a is first moved to its RESET position and is then moved in its TIMER-ON or TIMER-OFF position. The timer is then automatically programmed during the subsequent twenty-four hour period in accordance with the pattern of depression of the push button portion 18 of the control knob 48. During this twenty-four hour real time programming period, the red light 14 will be energized and the green light 25 will be energized and de-energized in accordance with the result of the various depressions of the control knob 48.

Refer now to FIGS. 4 and 5 which illustrate a form of the invention wherein the various components of the timer system are incorporated on and in an enclosure assembly 64 illustrated as having an attractive upwardly tapering shape. This enclosure assembly 64 is adapted to rest upon a table top or the like and includes a power cord 71 extending from the enclosure assembly 64 and terminating in a plug unit housing 73 having prongs 73a–73b adapted to be inserted within the openings of a conventional electricl outlet socket. The plug unit housing 73 also has a socket 74 adapted to receive the prongs of a plug unit extending at the end of a power cord extending from the controlled device like a table lamp. The power cord 71 contains the three conductors 2, 2' and 2" shown in FIG. 1. Mounted for depression in the center of the top wall 64a of the enclosure assembly 64 is the push button 18 shown in FIG. 1. Mounted for rotational movement in one direction on the bottom wall 64b of the enclosure assembly 64 is a ring 28a forming the time setting dial 28a shown in FIG. 1. The control arm 19a of the timer on-off setting means 19 projects through an opening in the bottom wall 64b. The red indicator lamp 14 is visible through an opening in the enclosure side wall 64c. The reference index mark 29 for making present time settings is shown on the wall 64b adjacent to the periphery of the time setting ring or dial 28a.

The timer of FIGS. 4 and 5 is programmed and operated in the identical manner described in connection with the timer of FIGS. 2 and 3.

Refer now to FIGS. 6–8 which illustrate a form of the invention wherein the various components making up the timer system are incorporated on and within an enclosure 80 shown in the form of a rectangular housing. Projecting from one face 80a of the enclosure 80 are a pair of prongs 82 which are pluggable into an electric outlet socket. On another face 80b of the enclosure 80 there is a socket unit 84 with socket openings 84a–84b into which can be plugged the power cord of the device to be controlled. On still another face 80c of the enclosure is mounted for rotation a time setting and programming dial 28a', which is most clearly shown in FIGS. 7 and 8. Projecting through an elongated opening 86 in the enclosure face 80c is the operating arm 19a of the timer on-off setting means 19 shown in FIG. 1.

Referring now more particularly to FIGS. 7 and 8, as there shown the dial 28a' has on the periphery of the outer face thereof twenty-four hour indicating indicia on a lightly colored half of the dial face representing the daylight hours. On the other relatively darkly colored half of the dial face are hour indicating indicia representing the nighttime hours. In radial alignment with the hour-indicating indicia are radially movable control members 90 movable between extreme positions, the innermost of which represents a power-on marker generating position, and the outermost of which is in a power-off marker generating position. Each control member 90 is frictionally mounted for movement between these extreme positions in suitable guideways 92 (FIG. 8). The dial face has radial slots 94 to permit movement of each control member. Each control member has an arcuate actuating projection 96 which, when the control member 90 is in innermost position, will occupy approximately 15 degrees on an imaginary circle coaxial with the axis of rotation of the dial 28a'. The enclosure face 80c containing the dial 28a' also contains the red programming light lens unit 14'. The dial 28a' also includes a 96-tooth ratchet 97 that actuates a pulse generator 97' to generate pulses which control the entry of markers in the proper locations of the storage means.

The enclosure face 80c is formed by a wall 100 from which projects a switch unit 102 which has a control button 104 projecting from the front thereof so as to be in the path of movement of the actuating projections 96 in the radially innermost positions thereof. A reference index mark 29 is positioned on the enclosure face 80c adjacent to the top periphery of the dial 28a'. For a fast programming operation, the reference index mark 29 is used to set present time before a rapid programming operation is begun. The user then sets the various control members 90 to the particular on and off marker generating positions desired for the hour time intervals beginning with the hour identified by the adjacent hour indicating indicia. The present time setting and control member setting operations described are effected while the operating arm 19a is in its RESET position. Then, to rapidly program the timer system, the control arm 19a is moved to its TIMER-ON or TIMER-OFF position and the dial 28a' is rotated one revolution. When the control button 104 of the switch unit 102 is in the path of movement of an arcuate projection 96 of a control member 90, it will be depressed to generate a power-on marker. When the button 104 is not depressed, the switch unit 102 will not generate an on-marker. In other respects, the timer shown in FIGS. 6–7 operates in the same manner as the timers illustrated in FIGS. 2–5, except that there is no push button 18.

Refer now to FIG. 9 which illustrates, among other things, a detailed block diagram of the exemplary control circuit 12 represented by a single block in FIG. 1. Also, FIG. 9 shows details of the lighting turn-on and turn-off means 15 and the timer on-off setting means 19 not shown in FIG. 1. Additionally, FIG. 9 shows in solid and dashed lines connections of the DC power supply 6 respectively for the wall switch and table mounted embodiments of the invention shown in FIGS. 2 and 3, on the one hand, and FIGS. 4 and 5, on the other hand.

When the timer system of the invention is mounted in a wall switch opening of a new home as it is being built, it could be wired to receive its control power directly across the voltage AC power lines 2–2' without too much difficulty. However, this is not so when it replaces a conventional toggle on-off wall switch, since access to both AC power supply lines 2–2' is not normally made thereto, and it would be advantageous if the wall switch opening mounted embodiment of the invention did not require rewiring of an existing wall switch opening. Accordingly, in FIG. 9, the AC input to the DC power supply 6 is shown connected by a pair of conductors 3 and 101 across the terminals 4a–4b of the triac 4 where the wall switch opening contains only the input power conductor 2 and the conductor 2" extending to a remote lighting or other controlled device 5. In the circuit shown, when control arm 19a is in a TIM- ER-ON or TIMER-OFF position there is obviously voltage present across the triac when it is in a non-conductive state. When, however, the triac is to be conducting, there is a short period at the beginning of each half cycle of the applied AC voltage during which current is routed into the triac control terminal 4c to trigger the triac into conduction for that half cycle. When this current into the triac control terminal reaches a given threshold value, the triac starts conduction. It is during this short period during each half cycle when the triac is in the non-conductive state that the DC power supply 6 obtains its control power. It is old in the prior art to provide a DC power supply 6 which obtains its input voltage from the AC voltage conditions across a triac, and so this application will not disclose the details of such a circuit. (One such circuit is shown in U.S. Pat. No. 3,940,660, granted Feb. 24, 1976, to F. Edwards.) It will be assumed that the DC output from the power supply 6 will be adequate to energize the various circuits identified in block form in FIG. 9. FIG. 9 also shows a dashed line 101' representing a conductor extending between the power line 2' and one of the inputs of the DC power supply 6 which substitutes for the conductor 101 for the timer system incorporated in an enclosure settable on the top of a table as shown in FIGS. 4 and 5.

FIG. 9 shows the timing means 26 as a conventional pulse divider circuit which receives pulses at a pulse repetition rate of 60 (or 120) pulses per second, either directly from the AC power lines 2—2' or from another part of the circuit. The pulse divider circuit 26 will produce on its output line 26a thereof pulses which are spaced apart time intervals equal to the basic programmable time interval of the timer system, which is 15 minutes in the embodiments of the invention shown in FIGS. 2-5. The output line 26a extends to the input of a conventional normally-open gate 107 which passes these pulses to its output line 107a when a gate opening signal is fed to the control terminal 107b thereof. A control line 108a extends to this control terminal from the Q' output terminal of a set-reset bistable 108. The set-reset bistable 108 (and others to be referred to) are conventional circuits each of which has Q' and Q output terminals respectively having binary voltage states "1" and "0" (which may be represented by a relatively high and low DC voltage, respectively) when the bistable 108 is in a reset condition, and "0" and "1" binary voltage states when the bistable is in a set condition. The bistable 108 is set by the feeding of a set pulse to a set "S" terminal thereof, and is reset when a reset pulse is fed to its reset "R" terminal. During real time programming, and at all other times other than during rapid programming and what will be referred to as program review, the bistable 108 is in its reset condition where the "1" voltage state of the Q' terminal of the bistable 108 wil open the gate 107 so that the output of the pulse divider circuit 26 appears on gate output line 107a. A pulse counter input line 109a extends from the line 107a to the input of a self-resetting pulse counter 109 which resets itself automatically to zero count when receiving a number of pulses representing a twenty-four hour period. (It will be assumed that any gate circuit shown in the drawings will be opened when it receives on its control terminal a "1" binary signal and will be closed when it receives a "0" binary signal.) The Q terminal of the bistable 108 controls a normally-closed gate 112 which controls the feeding of pulses to storage means 21 which are generated by rotation of the time setting dial 28a one marker position. Therefore, the gates 107 and 112 operate in such a manner that one gate is open while the other gate is closed.

The pulse counter 109 has an output terminal 109b which has a normal "0" binary voltage state which changes to a "1" binary voltage state when the pulse counter reaches its maximum count. (The pulse counter 109 will provide a "1" binary output state every 96 pulses when the pulse divider circuit output produces pulses 15 minutes apart.) A line 110 interconnects the pulse counter output terminal 109b and the "S" terminal of a set-reset bistable 111. The set-reset bistable 111 is set by a "1" binary signal from the pulse counter 109 and is only reset when the timer on-off setting means 19 is in its RESET condition, namely when the control arm 19a is moved to its RESET condition. (The control arm 19a, it will be recalled, is only returned to its RESET condition when it is desired to initially program or re-program the timer system.) The Q' and Q output terminals of the bistable 111 are respectively connected by conductors 114' and 114 to the control terminals of respective gates 118 and 118' which are respectively initially open and closed during programming and are respectively closed and opened after the timer system has been programmed.

A differentiating network 113 is connected to the output terminal 109b of pulse counter 109 to derive pulses across a resistor 113a during each change of the voltage condition at the terminal 109b. The voltage pulses across this resistor are fed by a line 113' to the RESET terminal of the bistable 108 to reset the same after completion of a fast programming of the timer. The bistable 108 is set at the beginning of a fast programming operation in a manner to be described.

From the preceding description, it is apparent that the pulse counter input line 109a receives positive pulses both from the gates 107 and 112 which respectively supply time interval identifying pulses respectively during real time and fast programming of the timer system. These pulses are coupled by a line 117 to the shift pulse terminal 119 of a conventional but uniquely used shift register 21 constituting the previously described storage means 21. The shift register 21 has 96 individual stages, stage numbers 1,2,95 and 96 being numbered in FIG. 9, each having a Q output terminal (not shown) which, when the stage is reset, has a "0" binary output state representing a power-off marker state, and when the stage is set has a "1" binary output state representing a power-on marker state. (The binary states "0" and "1" represent respectively zero and plus DC voltage states in the example of the invention being described.) Also, a "1" binary signal fed to a data input terminal 120 of the shift register will cause the output terminal of the first stage thereof to assume a "1" binary voltage state. Conversely, a "0" binary signal fed to the data input terminal 120 will cause this output terminal to assume a "0" binary voltage state. The feeding of a shift pulse to shift pulse terminal 119 will cause the various binary states on the output terminals of the various stages of the shift register to shift one stage forward. The load terminals of the aforesaid gate 118 are connected between the output terminal 96 of the 96th stage and the data input terminal 120 thereof. The gate 118 is open only after completion of a real time or fast programming of the timer system to recirculate the markers in the shift register.

The output of the shift register 21 appearing on output terminal 96 of the 96th stage of the shift register and on the output terminal 95 of the 95th shift register stage are respectively coupled through gates 122 and 122' to a common output line 124 which effects control over the power switch 4 in a manner to be described. The gates 122' and 122 are operated in an opposite sense so that when one gate is open the other is closed, and vice versa. The gate circuits 122 and 122' are controlled by a toggle bistable 126 having Q' and Q outputs respectively connected by conductor 126a' and 126a to the control terminals of gates 122' and 122. The toggle bistable 126 has a toggle input terminal "T" which is connected to the differentiating network resistor 113a associated with pulse counter 109, so that the toggle bistable is successively operated between set and reset conditions every twenty-four hours where the gates 122 and 122' are alternately opened and closed. Accordingly, when the timer system is operated to its TIMER-ON mode of operation the power switch control signals from the shift register will alternately be the turn-on or turn-off markers in the 95th and 96th stages of the shift register, so that the control functions carried out by the shift register 21 will vary somewhat on successive days.

It will be recalled that during real time programming, the markers are set into the storage means (shift register) 21 by the on-off operation of the control means which normally would control the operation of the lighting or other controlled device 5. In FIG. 9, this on-off control is assumed to be pushbutton 18. When pushbutton 18 is momentarily depressed, contacts 18a and 18b connected respectively to a source of positive voltage and line 18b are closed so that a "1" binary signal is produced. The output line 14a is coupled to the input of an "OR" circuit 127 whose output is coupled to the 37 T" terminal of a toggle bistable 129. The Q terminal of the bistable 129, on which a "1" binary signal appears when the bistable is set and on which appears a "0" binary signal when the bistable is reset, is coupled by a conductor 132' to one input of an "AND" gate 134 whose other input extends is connected to the output of a negative edge one shift multivibrator 136 whose input is connected to the output of a zero crossing detector 135 whose input is connected by conductors 137–137' respectively across the triac terminals 4a–4b. The zero crossing detector 135 is a conventional component which produces voltage (e.g. a positive voltage) on its output line 135e during the period when the input thereof falls between small values on either side of zero. When the applied voltage thereto exceeds these values the output thereof drops to zero. The negative edge one shot multivibrator 136 generates a positive pulse on its output line 136a when the voltage input thereto drops from a positive value to zero. The "AND" gate 134 passes this positivie pulse when the Q output line 132' of toggle bistable 129 has a positive voltage thereon, namely when the power switch 4 is to be rendered conductive. Since a positive output of the one shot multivibrator occurs after the AC voltage passes through zero, the DC power supply 6 can be energized before triac conduction starts.

The Q terminal of the toggle bistable 129 is connected by a conductor 132' to the signal input of gate 118' which, it will be recalled, is only open during a first twenty-four hour programming period. The output of gate 118' is coupled by conductor 135 to the data input terminal 120 of the shift register 21. After the initial resetting of the timer system during real time programming, when push button 18 is first depressed, this will result in the setting of toggle bistable 129 and the initiation of a "1" binary voltage state at the Q terminal thereof, which will then be coupled through gate 118' to data input terminal 120 to set a power-on marker in the first stage of the shift register 21. The pulse generated by the next (second) depression push button 18 will reset toggle bistable 129, which then returns the Q terminal to its reset "0" binary voltage state, which returns the output terminal condition of the first shift register stage to a power-off marker "0" state. As each new shift pulse generated by pulse divider 26 is fed to the shift pulse terminal 119 of the shift register 21, the output terminal of the first shift register stage will assume the same binary state which appears on the data input terminal 120. After programming of the shift register is completed, as previously indicated, gate 118' receives a gate-closing signal from the Q' terminal of the pulse counter-controlled set-reset bistable 111. The gate 118, controlled by the Q terminal of bistable 111, and connected between shift register output terminal 96 and data input terminal 120, will then be opened to recirculate the markers set into the shift register stages.

As previously indicated, in the embodiments of the invention of FIGS. 2–5, fast time programming is achieved by rotation of a dial 28a and depression of push button 18. In these embodiments of the invention, the dial 28a (which is part of the control knob 48 in FIGS. 2 and 3) has time interval indicating markers and hour-indicating indicia 28b along the periphery thereof. Also, prior to programming, the dial 28a is set to bring a marker to the present time opposite reference index mark 29, before the control arm 19a is moved from its reset (or power-off) position. The control arm 19a is then moved to either its TIMER-OFF or TIMER-ON (either of which may be a programming position). If he decides that the control device should be in an energized state at present time, the push button 18 is depressed to set a power-on marker in the first stage of the shift register 21. The user then rotates the dial 28a to a position where the time indicated opposite reference index mark 29 is the time when it is desired to de-energize the controlled device. In the process of so moving the dial 28a, the dial 28a is moved to bring the next time interval marker 28b or 28b' *to the reference index mark 29. Each time he moves the dial 28a to bring a new marker opposite the reference index mark, a shift pulse is fed to shift pulse terminal 119 of the shift register 21. Then, the first stage of the shift register is operated to a "0" or "1" binary state depending upon the state of the "Q" terminal of the toggle bistable 129 as controlled by operation of the push button 18.

The rotation of dial 28a one marker position may generate a shift pulse in any one of a number of different ways. As shown in FIG. 9, the shaft to which the dial 28a is attached rotates a notched wheel 145, along the periphery of which slides a spring-urged pawl 147. When the dial 28a is rotated between successive time interval markers, this oscillates the pawl 147 once to cause the same to strike a piezoelectric pulse generator 149 which generates a positive pulse. This pulse is fed by a line 151 to the "S" terminal of the set-reset bistable 108 to set the same. The initial "1" and "0" binary signal states on the Q' and Q terminals of bistable 108 then reverse to "0" and "1" binary signal states. The "0" voltage then coupled from the Q' terminal of bistable 108 by output line 108a will then close the gate 107, to prevent coupling of timing pulses from the pulse divider circuit 26 to the input line 109a of pulse counter 109 and to line 117 extending to the pulse shift terminal of 119 of shift register 21. The Q terminal of bistable 108 is coupled by an output line 153 to gate 112 coupled through a delay circuit 159 to the output of pulse generator 149, and also by an output line 155 to an input of "OR" circuit 157. Thus, gate 112 is opened to feed delayed pulses to pulse counter 109 and shift register shift pulse terminal 119 as bistable 108 is set by initial movement of the dial 28a. The delay circuit 159 ensures that each pulse from pulse generator 149 is fed to gate 112 after the gate is opened.

After the timer system is completely rapidly programmed by advancement of the dial 28a one full revolution with the depression of pushbutton 18 to effect the desired entry of turn-on and turn-off markers in the various stages of the shift register 21 in the manner just described, the counter operated bistable 111 closes gate 118', to prevent any modification of the markers stored in the shift register, until the control arm 19a is moved to its RESET position.

It will be recalled that, prior to completion of a real time or fast programming operation, a red light 14 is energized. To this end the red light 14 is shown connected between ground and the output line 12b of gate 158, whose input is connected to a suitable source of energizing voltage, such as the output of DC power supply 6. The control terminal 158a of gate 158 is connected by a line 160 to the Q' terminal of bistable 111 so that the gate 158 receives a gate-opening signal only during a programming operation.

FIG. 9 also shows the green lamp 25 connected between ground and a control circuit output line 126 leading to the Q terminal of the toggle bistable 129 controlling the triac 4. The voltage on the Q terminal of bistable 129 is a relatively high positive DC voltage representing a "1" binary state thereof when the triac 4 is to be rendered conductive and so the green lamp 25 is energized at such time.

FIG. 9 shows an exemplary switching circuit for the switch 42 shown in FIG. 3 (which switch 42 may also be used in the embodiment of the timer system of the invention shown in FIGS. 4–8). As illustrated, this switch 42 includes a bridging contact 160 which, in the TIMER-ON and TIMER-OFF positions of the control arm 19a, respectively bridges pairs of contacts 162–162' and 164–164'. Contact 162' is grounded and contact 164' is connected to a source of positive voltage representing a "1" binary signal. Contacts 162 and 164 are connected to a common conductor 19b extending to the aforementioned "OR" circuit 157.

The signals on "OR" circuit input line 19b are respectively the "0" and "1" binary signals when the control arm 19a is respectively in its TIMER-OFF and TIMER-ON positions. When the control arm 19a is in its reset position, the switch 42 will open the main power arm on-off switch 8 connected in series with input power lines 2—2'. As previously indicated, the reconnection of power to the entire timer system will cause the conditions of all bistables, the pulse counter 109 and shift register to be automatically reset. Such automatic resetting is obtained by designing the basic circuits in the well-known manner involved to favor a particular state of operation when power in initially fed thereto.

Immediately after completion of and within the first time interval period of a fast programming operation, it is possible to check the pattern of turn-on and turn-off markers set into the various storage locations of the shift register 21. (It should be noted that the time intervals assigned to a particular storage location in a shift register is continuously changing as the markers thereof are circulating therein). Program Review is achieved in such case as the dial 28a is stepped to bring the various time interval markers 28b opposite the reference index mark 29. One complete revolution of the dial 28a from the initial dial setting will generate 96 pulses fed to the shift pulse terminal 119 of shift register 121 in a manner occurring during a normal 24-hour programming from present time, and the various voltage conditions at the output terminal of the 95th stage of the shift register will then be fed to the common shift register output line 124 to effect operation of the power switch 4 in the same manner as called for by the markers in the shift register stages. The green light 25 will then indicate whether a turn-on or turn-off marker is stored in the shift register stage assigned to the time interval set by the dial 28a at the instant involved.

The manner in which the signals on the output terminals 95 and 96 of the shift register 21 control operation of the toggle bistable 129 which, in turn, controls the state of conduction of the triac 4, will now be described. The shift register output line 124 is connected to the input of a circuit identified as the edge activated pulse generator circuit 170, the exemplary details of which are shown in FIG. 11 to be described. Suffice it to say at this point, the edge activated pulse generator circuit 170 is a circuit which generates a power turn-on or power turn-off signal only when there is a voltage change on the input line 124 indicating that the output voltage of the 95th or 96th stage of the shift register coupled thereto changes due to a change in the marker stored therein and the previous marker stored therein corresponds to the power switch condition (because the programmed timer control has not been overridden by the manual operation of the pushbutton 18). The circuit 170 generates on an output line 171a' a power turn-on "1" (a positive binary signal pulse) when the voltage on the input line 124 suddenly increases in a positive direction and provided there is an enabling signal fed to an enabling terminal E'. When the voltage on line 124 suddenly decreases, there is produced on an output line 171a a "1" binary signal, provided there is an enabling "1" binary signal fed to an enabling terminal E. The output lines 171a' and 171a extend to the input of the aforementioned "OR" circuit 127 (which also receives pulses from the pushbutton-operated pulse generator circuit line 14a). As previously indicated, any "1" binary signal (i.e., positive voltage) appearing at any input of this "OR" circuit is fed to the "T" terminal of the toggle bistable 129 to change the output condition thereof.

Extending to the enabling terminals E' and E, respectively, are output lines 172' and 172 extending respectively from "AND" gates 174' and 174. Control lines 129a' and 129 extend respectively between the Q' and Q output terminals of the toggle bistable 129 and one of the inputs of the "AND" gates 174' and 174. The other inputs of "AND" gates 174 and 174' are respectively connected to the line 178 extending to the output of the "OR" circuit 157 which receives signals from the Q output terminal of the set-reset bistable 108 and from the input line 19b extending from the switch terminals 162–162' and 164–164'. It should be apparent from these connections from the toggle bistable 129 to "AND" gates 174' and 174 is such that only that part of the control circuit 170 which controls the feeding of signals to the decreasing voltage sensing output line 171a is disabled when the toggle bistable 129 is in a power turn-off reset condition and that only that part of circuit 170 which controls the feeding of signals to the increasing voltage output line 171a' is disabled when the toggle bistable 129 is in a power turn-on set condition.

As previously indicated, when the timer has been programmed and is set into its TIMER-ON mode of operation, if the user desires to override the timer control of the power switch 4, depression of the pushbutton 18 will override this control until the marker stored in the shift register calls for a condition of the power switch consistent with the switch condition. This first depression of the pushbutton which overrides the timer's automatic control of the power switch reverses the condition of the toggle bistable 129 so that the part of the edge activated pulse generator circuit 170 which was enabled to report to the voltage charge on the input line 124 cannot respond. The other part of the circuit 170 which is so enabled cannot respond to the next change in the output of the 95th or 96th stage of the shift register which will be in the wrong direction to operate this part of the circuit.

The entire circuit 170 is disabled from operation when the "AND" gates 174'-174 do not receive a positive voltage from the line 19b associated with switch means 42, namely, when the control arm 19a is in its RESET or TIMER-OFF position. The timer circuit 170 (when not overridden) is enabled for operation in the normal manner each time the set-reset bistable 108 is operated to its SET condition, that is, when the time setting dial 28a is rotated from its initial position when fast programming is initiated during program review of the timer system to be described.

The edge activated generator circuit 170 may take a number of different forms. As shown in FIG. 11 it comprises what is commonly referred to as a positive edge one shot multivibrator 170a' and a negative edge one shot multivibrator 170a. The positive edge one shot multivibrator 170a' is a well known circuit which generates a positive pulse on its output line 171a' only when a voltage fed to the input 173' thereof is a positive going voltage when exceeds a given minimum value. The negative edge one shot multivibrator 170a is a well known circuit which produces a positive pulse on its output line 171a only when the voltage fed to the input terminal 173 thereof exceeds a given negative voltage. The input lines 173' and 173 are coupled to the input line 124 extending from the shift register 21 through capacitor 175 so that a sudden change in voltage at the shift register stage output terminal 95 or 96 from zero to a positive voltage will appear as a positive voltage at the output side of capacitor 175, and a sudden drop to zero in the voltage from the shift register output terminals 95 or 96 to 0 will appear at the output side of the capacitor 175 as a negative voltage. The positive and negative edge one shot multivibrators will not respond to said input voltages fed thereto unless a "1" binary signal, namely a positive voltage in the example of the invention being described, is fed to their enabling terminals E' and E thereof.

Refer now to FIG. 10 which illustrates modifications in the circuit of FIG. 9 necessary to adapt it to the form of the invention shown in FIGS. 6-8, where the components of the timer system are incorporated into an enclosure pluggable into a wall outlet socket and real time programming is achieved by operating the on-off control, like lamp pull chain 5a of the device to be controlled. As previously very briefly explained in connection with the simplified basic block diagram of FIG. 1, in such case, a voltage sensing circuit 9 is needed which responds to the various changes in the voltage conditions across the triac load terminals 4a-4b to perform the same functions as the successive operation of the pushbutton 18 in the forms of the invention of FIGS. 2-5. The pull chain 5a alternately opens and closes a switch 5c in series with incandescent lamp 5b, the switch and lamp in FIG. 10 being connected between the conductor 2" and the main on-off switch 8. (The AC power line 2 extending directly to the load terminal 4a of the triac 4 is assumed to be a grounded line.)

For the timer to control the energization and de-energization of the triac and the operation of the pull chain switch 5c to be effective in real time programming of the timer when switch 5c is in series with a sometimes non-conductive power switch, it is necessary for the switch 5c to end up in a closed condition at the beginning or completion of each control operation. Therefore, while a single depression of the push button 18 previously described effected a basic control operation, it is advantageous that the pull chain 5a in FIG. 10 be pulled twice for each desired control operation to be performed thereby, to ensure that the pull chain switch 5c is closed at the beginning and completion of each control operation. It will be assumed that before the table lamp is plugged into the socket openings 84a-84b of the enclosure 80 shown in FIG. 6, that the switch 5c is closed. This can be simply obtained by first plugging the table lamp directly into a wall outlet socket and operating the pull chain 5a to energize the lamp 5b.

It should be noted that when the table lamp 5 is plugged into the timer enclosure under the conditions just described, and the control arm 19a of the timer is moved from a reset to a TIMER-ON or TIMER-OFF position, the main toggle control bistable 129 will be in a reset condition when the Q output terminal has a "0" binary voltage (i.e., zero voltage) thereon. The full AC input voltage will then appear across the load terminals 4a-4b of the triac which is then non-conductive. When the pull chain 5a is then pulled once, this will open switch 5c and cause the voltage across the triac load terminals 4a-4b to be zero. This will effect the setting of the toggle bistable 129 to cause the Q terminal output to be in a "1" binary state because of the circuitry now to be described. This first pulling of the pull chain 5c really prepares the triac for operation by the next pull on the pull chain which will reclose the switch 5c, to enable the applied AC voltage to render the triac conductive each half-cycle because of trigger pulses then coupled to the control terminal 4c thereof each half cycle of the input AC. A third pulling of the pull chain opens the switch 5c and toggles the bistable 129 to reset the same to render triac 4 non-conductive.

If the operation of the pull chain is to effect a real time programming operation, the first and third pulls on the pull chain 5a respectively cause power turn-off and power turn-on markers to be entered into the first shift register stage through a circuit including an "AND" gate 202 having an output line 202a extending to the input of the aforementioned gate 118'. One of the inputs of the "AND" gate 202 is coupled by a conductor 204 to the Q terminal of the toggle bistable 129, and the other input thereof is connected by a line 206 to the Q' terminal of a pulse counter shown as a 3-stage scale-of-two pulse counter 208.

This pulse counter 208 has three interconnected toggle bistables 208-1, 208-2 and 208-3. The Q terminal of bistables 208-1 and 208-2 are respectively connected to the toggle "T" terminal of the second and third bistables 208-2 and 208-3. When the Q terminals of all of the bistables have a "0" binary state and four pulses are fed to the toggle terminal "T" of the first bistable 208-1, the binary state of the Q terminal of the third bistable 208-3 changes from a "0" to a "1" binary state. A count lock-in line 210 extends from the latter "Q" terminal to the "T" terminal of the first bistable 208-1 through an "OR" gate 212. Since the binary states of the "Q" terminal of the bistable 208-3 are steady state plus or zero DC voltages, the resultant feeding of this constant positive DC voltage representing the "1" binary state will freeze the condition of the pulse counter at count No. 4, until the bistables are reset by the feeding of a positive pulse to reset terminals "R" of these bistables 208-1 208-2 and 208-3. The Q terminal of the bistable 208-3 is connected to a differentiating network 214 comprising a capacitor 214a and a resistor 214b. The voltage drop across the resistor 214b are positive and negative pulses following the upswing and downswing of the DC voltage on the Q terminal of the bistable 208-3. These pulses are fed through a rectifier 217, which passes only the positive pulses to the "OR" gate 127 which passes the pulse to the "T" terminal of the main toggle bistable 129. It is thus apparent that whenever the voltage condition of the Q terminal of the bistable 208-3 changes from a "0" to a "1" binary state, then and only then is a positive pulse fed to the bistable 129 to change its state.

Until the count of the pulse counter 208 is frozen as described, the "T" terminal of the first bistable 208-1 thereof receives pulses through the "OR" circuit 212 fed thereto from an output line 220 extending from a 60 cycle pulse generator circuit 222. This circuit may comprise two rectifiers 222a and 222b connected in series between a plus five volt DC terminal 214 and ground 216. The connections of these rectifiers are arranged so that the plus five volt DC voltage source back-biases these rectifiers. A resistor 224 is connected between the connections of these rectifiers and the terminal of the main on-off switch 8 remote from the AC hot input line 2'. Because of the biasing of these rectifiers, the voltage at the connections between these rectifiers will appear as square wave pulses W1, which have peak values of about plus five and one-half volts. The pulse counter 208 will count these pulses (responding only to the leading edges thereof) until the count of four is reached, when the voltage on the Q terminal of bistable 208-3 changes from a "0" to a "1" binary state which remains until bistable 208-3 is reset.

The various reset terminals "R" of the bistables 208-1, 208-2 and 208-3 are connected to the output conductor 226 of a rectifier and resistor circuit 230 like circuit 222 first described. Thus, the circuit 230 comprises rectifiers 230a and 230b connected in series between a plus five volt DC terminal 232 and ground 216. A resistor 232 is connected between the connections of these rectifiers and conductor 2" extending to the triac load terminal 4b. Whenever the triac 4 is conducting, narrow five volt amplitude pulses P1 occur at the juncture between the rectifiers 230 as the triac is rendered conductive each half cycle and coincident with the leading edges of the much wider current pulses W1 fed to the "OR" circuit 212. These five volt pulses P1 represent the voltage at triac load terminal 4b as the positive going portion of the AC input voltage reaches the value at which the triac is rendered conductive by a trigger pulse fed to the control terminal 4c thereof. The rectifiers of the circuits 222 and 230 described eliminate any negative going voltages from the output of these circuits and clip or limit the amplitude of the output pulses to the approximately five and one-half volt output level referred to. (The added one-half volt is required to effect the conduction of the upper rectifiers 222a and 230a of these circuits.) The pulses P1 effect resetting of the bistables 208-1, 208-2 and 208-3, causing the "1" binary signal on the Q terminal of the bistable 208-3 to change to a "0" binary signal until the pull chain 5a is operated to open the associated circuit again. Then, the counter circuit 208 once again begins to count the pulses generated by the circuit 222, and the voltage at the Q terminal of the bistable 208-3 will go from a "0" to "1" binary state, to effect operation of the circuit in the manner previously described.

Thus, each time the pull chain 5a is pulled twice in immediate succession the first of the pulling operations opens switch 5c to interrupt the generation of reset pulses due to the disappearance of voltage at triac terminal 4b and permit the counter to count to 4, to generate a positive pulse at the rectifier 217 which toggles bistable 129 during programming to enter turn-on or turn-off markers in the shift register 21. The second of each pair of pulling operations which re-closes switch 5c permits the toggle bistable 129 to determine the condition of triac 4 and to enable counter 208 to reach its maximum count.

It should be apparent that the present invention has provided an extremely unique, easy to program, low cost and reliably operating timer system adaptable to the various applications described. It should be understood, however, that numerous modifications may be made in the most preferred forms of the invention described and shown in the drawings without deviating from the broader aspects of the invention.

We claim:

1. A twenty-four hour repeat cycle home lighting timer system comprising: a lighting device; a timer power input terminal; a load device-connecting terminal; power switch means coupled between said timer power input and load device-connecting terminals; means connecting said load device-connecting terminal to said lighting device; said power switch being operable to circuit closing and opening conditions which respectively effect coupling and de-coupling of said load device-connecting terminal to and from said lighting device; manually operable light turn-on and turn-off means operable successively to light turn-on and turn-off conditions which respectively normally operate said power switch means to said circuit closing and circuit opening conditions; manually responsive timer condition setting means settable to at least timer-off and timer-on and reset conditions; storage means having respective storage locations assigned to various successive time intervals over a twenty-four hour programming period and in which light turn-on and turn-off markers can be respectively placed or retained; synchronous timing and storage location accessing means for continuously synchronously accessing the storage locations containing the markers for the various time intervals involved; and control means responsive first to the setting of said setting means from said reset to either said turn-on or turn-off condition and then to the operation of said manually operable light turn-on and turn-off means only during the first twenty-four hour programming period for storing or retaining said turn-on and turn-off markers under control of said accessing means in appropriate storage locations of said storage means only during the first twenty-four hour programming period so that the timer system is programmed to effect automatic control of said lighting device in accordance with the actual normal pattern of operation of said manually operable turn-on and turn-off means only during such period, and means for operating said power switch means in accordance with the synchronously accessed markers in said storage locations of said storage means when said setting means is in said timer-on condition and for preventing control of said power switch means by said marker when said setting means is in said timer-off condition.

2. A repeat cycle timer comprising: power input terminals; a load device connecting terminals; power switch means coupled between said power input and load device connecting terminals and operable to power circuit closing and opening conditions which respectively effect connection and disconnection of said power input and load device connecting terminals; manually operable power turn-on and turn-off means operable to power turn-on and turn-off conditions which respectively normally operate said power switch means to said power circuit closing and circuit opening conditions; manually responsive timer condition setting means settable to at least timer-off, timer-on and reset conditions; storage means having respective storage locations assigned to various successive time intervals over a given programming period and in which power turn-on and turn-off markers can be respectively placed; synchronous timing and storage location accessing means for accessing said storage locations during said time intervals and automatically repeating the same at the end of each access cycle; and control means responsive first to the operation of said setting means from said reset to either said timer-on or timer-off condition and then to the operation of said power turn-on and turn-off means only during said programming period for storing or retaining said turn-on and turn-off markers under control of said accessing means in appropriate storage locations of said storage means, so that the timer system is programmed to effect automatic control over power circuits in accordance with the actual normal pattern of operation of said power turn-on and turn-off means only during such period, and means for operating said power switch means in accordance with the synchronously accessed markers in said storage locations of said storage means when said setting means is in said timer-on condition and for preventing control of said power switch means by said markers in said storage means when said setting means is in said timer-off condition.

3. The timer of claim 2 wherein said timer includes rapid programming means including manually operable time setting means adjustable to different conditions representing said different time intervals; and means responsive to the condition of said time setting means and to the operation of said manually operable power turn-on and turn-off means for storing or retaining said turn-on and turn-off markers in said storage locations of said storage means for the time intervals involved, depending upon the particular condition of said time setting means when said manually operable turn-on and turn-off means is operated.

4. The timer of claim 2 wherein there is provided means responsive to the operation of said manually operable turn-on and turn-off means for changing the condition of said power switch whether or not said timer setting means is set to said timer-on or timer-off condition, and means, when said setting means is in the timer-on condition and said power switch means is left in a condition opposite to the condition called for by the marker in a storage location for the current time interval, for enabling a marker in a storage location for a following time interval calling for a change in the condition of said power switch to control the power switch only after at least one marker in a storage location for a following current time interval has corresponded to actual circuit opening and closing condition of the power switch.

5. The timer of claim 2 wherein said timer futher includes rapid programming means including manually operable time interval setting means adjustable to different conditions representing said different time intervals, individually manually operable control means, one for each of said time intervals, settable selectively to first and second conditions respectively representing desired energization or de-energization of a power circuit during the time interval involved, and means responsive to the condition of said time setting means and to the pattern of the set conditions of said individually operable control means for storing said turn-on and turn-off markers in said storge locations of said storage means.

6. The timer of claim 5 wherein said time interval setting means includes a rotatable dial rotatable over a surface visible beyond the perimeter of the dial, there being a reference mark on one of said surface and dial and hour-indicating indicia on the other of same which can be brought adjacent the reference mark and, where the time intervals are less than one hour in length there are provided between said hour-indicating indicia markers additional markers which identify the limits of the time intervals involved between said hour indicating indicia.

7. The timer of claim 5 wherein said time interval setting means is a dial rotatable over a given surface which extends beyond the perimeter of said dial, hour-indicating indicia visible along the periphery of said dial, and where said time intervals are less than one hour, there are provided markers between said hour-indicating indicia which delineate the margins of the time intervals between said hour-indicating indicia, said individually manually operable control means being individual marker signal actuating means-carrying members on the outer face of said dial opposite said various time segment-indicating markers and movable radially to opposite position representing turn-on and turn-off marker setting positions so that the desired pattern of turn-on and turn-off conditions can be set on the face of said dial.

8. The timer of claim 7 wherein there is provided marker control signal generating means in the paths of movement of said actuator means, depending on the set positions of the members carrying the same, so as to generate a corresponding pattern of marker control signals when said dial is rotated, said control means responding to said marker control signals to set said turn-on and turn-off markers in said storage locations.

9. The timer system or timer of claim 1 or 2 wherein said manually operable turn-on and turn-off means are incorporated in said lighting or load device and open and close a device switch in series with said device and power switch means and there is provided voltage sensing means responsive to the voltage changes caused by the successive opening and closing of said device switch, and control means including means responsive to the voltage sensed by said voltage sensing means and to said timing and storage location accessing means for storing or retaining said turn-on and turn-off markers in the appropriate ones of said storage locations of said storage means in accordance with the normal real time operation of the manually operable turn-on and turn-off means of said electrical device.

10. A timer comprising: a power input terminal; a load device connecting terminal; power switch means coupled between said power input and load device connecting terminals and operable to power circuit closing and opening conditions which respectively effect connection and disconnection of said power input and load device connecting terminals; manually operable power turn-on and turn-off means operable successively to power turn-on and turn-off conditions which are respectively normally to operate said switch means to said power circuit closing and circuit opening conditions; manually responsive timer condition setting means settable to at least reset, timer-off and timer-on conditions; timing means for identifying various time intervals over a twenty-four hour period starting with a given present time; storage means having respective storage locations assigned to said time intervals and in which power turn-on and turn-off markers can be respectively stored or maintained; synchronous timing and storage location accessing means for accessing said storage locations synchronously during said time intervals; and control means responsive to the operation of said manually operable power turn-on and turn-off means only during an initial programming period for storing or retaining said turn-on and turn-off markers under control of said accessing means in appropriate locations of said storage means, means responsive to the markers in said storage locations of said storage means when said setting means is set to said timer-on condition for effecting the automatic operation of said power switch means to said power circuit closing and opening conditions in accordance with the markers in the storage locations of said storage means, means responsive to the operation of said manually operable turn-on and turn-off means for changing the condition of said power switch means whether or not said timer setting means is set to said timer-on or timer-off condition, and means, when said setting means is in the timer-on condition and said power switch means is left in a condition opposite to the condition called for by the marker in a storage location for the current time interval, for enabling a marker in a storage location for a following time interval calling for a change in the condition of said power switch means to control the power switch means only after at least one marker in a storage location for a following current time interval has corresponded to the actual circuit opening or closing condition of the power switch means, and said control means further including means responsive to the setting of said timer condition setting means to said reset condition for removing all of the markers stored in said storage means, said turn-on and turn-off markers previously set into the storage locations for a twenty-four hour programming period remaining in such storage means until the system is reset.

11. The timer system or timer of any of claims 1, 2, 9 or 10, wherein there is provided means for indicating a still not completed programming period so that the user is aware as to whether or not the programming of the timer has been completed.

12. The timer system or timer of any of claims 1, 2 or 10 wherein said storage means is a circulating shift register having a data input terminal to which marker setting voltages are fed by said control means for setting a turn-on or turn-off marker in the particular stage of the shift register in position to receive such markers, and a shift signal input terminal for receiving a timing pulse for advancing the markers stored in the various stages of the shift register at a given time one-stage position and for preparing one of the stages of the shift register for storing a turn-on or turn-off marker therein in accordance with the voltage of said data input terminal, and said timing and storage location accessing means include shift signal generating means for generating pulses spaced apart intervals corresponding to said time intervals, and said shift register having a data output terminal associated with one of the shift register stages and at which power switch turn-on and turn-off voltages appear corresponding to the marker stored in such stage.

13. The timer system or timer of any of claims 1, 2, or 10 wherein said various means of the timer are incorporated in or on an enclosure which fits within a conventional wall switch opening commonly incorporating a power on-off toggle switch.

14. The timer system or timer of any of claims 2, 9 or 10 wherein said various means thereof are incorporated in an enclosure where said timer power input terminals are plug projections insertable into an electrical outlet socket, and said load device connecting terminals are exposed socket terminals in said enclosure.

15. The timer system of any of claims 1, 2, 9 or 10 wherein said various means making up said timer system are incorporated in an enclosure which can be set upon a table top, and said timer power input terminals are connected with means for electrically coupling the same to an outlet socket, and said load device connecting terminals are exposed power-plug receiving socket terminals on a separate housing connected to said enclosure by a power cord.

16. The timer of claim 3 wherein said various means making up said timer system are incorporated in an enclosure which can be set upon a table top, and said timer power input terminals are connected with means for electrically coupling the same to an outlet socket, and said device connecting terminals are exposed power plug-receiving socket terminals on a separate housing connected to said enclosure by a power cord, and said time setting means includes a rotatable dial mounted on the bottom of such enclosure and said manually operable turn-on and turn-off means is accessible on the top of the enclosure.

17. A timer and power control system comprising: a pair of AC input terminals to be connected to a commercial source of AC voltage; a pair of load device connecting terminals to be connected to a device to be either controlled automatically by the timer and power control system or by a manually operable control of the load device which manually operable control when successively operated successively opens and closes a device switch in series with the load device, the series circuit of the load device and switch to be connected across said load device connecting terminals; means for connecting one of said load device connecting terminals to one of said AC input terminals; a power switch having load terminals connected between the other load device connecting terminal and other AC input terminal, said power switch having a control terminal which when receiving a control signal operates the power switch in a load current conducting condition, said power switch being in a non-conducting condition in the absence of said control signal; storage means in which are to be stored or retained data for various time intervals over a twenty-four hour period during which said power switch is to be either in its load current conducting or non-conducting condition; manually responsive condition setting means operable to at least a timer-on condition; voltage sensing means responsive to the change in voltage conditions across said load terminals of said power switch which conditions are a zero voltage when the manually operable control of said load device opens the associated device switch and a useable voltage when the latter switch is closed and the power switch is in a conducting or non-conducting condition; control signal generating means responsive to the setting of said timer condition setting means to its timer-on condition for feeding said control signal to said control terminal of said power switch when the storage means indicates that the power switch should be in a load current conducting condition during a given time interval, said control signal generating means being responsive to the change in the voltage conditions across the load terminals of said power switch as sensed by said voltage sensing means resulting from the successive opening and re-closing operations of said switch of said load device by causing said control signal generating means to alternately initiate and determine the feeding of a control signal to the control terminal of said power switch, whereby succesive operations of said manually operable control of said load device will change the state of conduction of said power switch.

18. The timer and power control system of claim 17 wherein there is provided control means responsive to the change in the conditions across the load terminals of said power switch as sensed by said voltage sensing means resulting from the successive pairs of opening and re-closing operations of said switch of said load device for a first twenty-four hour period by entering information into said storage means indicating the time intervals during which said power switch is operated to either its load current conducting or non-conducting condition, to effect real time programming of the timer.

19. The timer and power control system of claim 18 wherein said manually responsive timer condition setting means is operable also to a reset condition, said first twenty-four hour period being measured from a point in time after said setting means is operated from said reset condition to at least one other condition thereof.

20. The timer and power control system of claim 19 wherein there is provided means responsive to the operation of said timer condition setting means to said reset condition for removing said information from said storage means to enable a new real time programming operation to begin after said setting means is operated to one of said other conditions.

21. The timer and power control system of claim 17, 18 or 20 wherein said system is housed in an enclosure having a pair of projecting terminals constituting said AC input terminals and pluggable into a conventional electrical wall socket, and said enclosure having a pair of exposed socket terminals constituting said load device connecting terminals into which is pluggable a conventional connector plug of a load device like a table lamp or the like.

22. The timer and power control system of claim 17 wherein said control signal generating means is responsive to successive pairs of operations of said switch of said load device to alternately initiate and terminate the feeding of a control signal to the control terminal of said power switch.

23. The timer or timer of any claims 1, 2, 10, or 17 wherein said power turn-on markers are identical markers placed in each storage location of said storage means associated with each time interval during which the power switch is to be in a circuit closing or load current conducting condition, and said turn-off markers are identical markers placed in each storage location of said storage means associated with each time interval during which said power switch is to be in a circuit opening or non-conducting condition.

24. A timer comprising: power input terminal; a load device connecting terminal; power switch means coupled between said power input and load device connecting terminals and operable to power circuit closing and opening conditions which respectively effect connection and disconnection of said power input and load device connecting terminals; manually operable power turn-on and turn-off means; manually operable timer condition setting means settable to at least timer-on, timer-off and reset conditions; storage means having respective storage locations assigned to various time intervals over a twenty-four hour period and in which power turn-on and turn-off markers can be respectively stored or retained, said storage means being a continuously marker recirculating shift register with shifting storage locations for the markers; and control means including programming means responsive to said power turn-on and turn-off means for storing or retaining said turn-on and turn-off markers in appropriate ones of the storage locations of said shift register during a first twenty-four hour period, said turn-on and turn-off markers thereafter continuing synchronously to recirculate in the shift register until the shift register is reset, means responsive to said markers stored or retained in said storage locations of said storage means when said manually operable timer condition setting means is set to said timer-on condition for effecting the automatic operation of said power switch means to said power circuit closing and opening conditions in accordance with the markers stored or retained in the storage locations of said storage means, means responsive to the operation of said manually operable turn-on and turn-off means for changing the condition of said power switch means whether or not said timer setting means is set to said timer-on or timer-off condition, and means, when said setting means is in the timer-on condition and said power switch means is left in a condition opposite to the condition called for by the marker in a storage location for the current time interval, for enabling a marker in a storage location for a following time interval calling for a change in the condition of said power switch means to control the power switch means only after at least one marker in a storage location for a following current time interval has corresponded to the actual circuit opening or closing condition of the power switch means, and means responsive to the setting of said timer condition setting means to said reset condition for removing all of the markers set in said shift register.

25. The timer of claim 24 wherein said turn-on markers are identical markers placed in each storage location of said shift register associated with each time interval during which the power switch is to be in a circuit closing or load current conducting condition, and said turn-off markers are identical markers placed in each storage location of said shift register associated with each time interval during which said power switch is to be in a circuit opening or non-conducting condition.

26. The timer system of claim 24 or 25 wherein said timing means includes manually operable time setting means adjustable to a present time condition and to different conditions identifying said different time intervals over a twenty-four hour period from present time; and said control means being responsive to the conditions of said manually operable time setting means and to said power turn-on and turn-off means for storing said turn-on and turn-off markers in the storage locations of said shift register assigned to said time intervals.

27. The timer and control system of claim 24 or 25 wherein said shift register has a data input terminal to which said marker signals are fed by said control means for setting a turn-on or turn-off marker in the particular stage of the shift register in position to receive such markers, and a shift signal input terminal for receiving timing pulses for advancing the markers stored in the various stages of the shift register at a given time one-stage position and for preparing one of the stages of the shift register for storing a turn-on or turn-off marker therein in accordance with the voltage of said data input terminal, and there is provided shift signal generating means for generating said timing pulses spaced apart intervals corresponding to said time intervals, and said shift register having a data output terminal associated with one of the shift register stages and at which power switch turn-on and turn-off voltages appear corresponding to the marker stored in such stage.

28. In a timer comprising a timer power input terminal; a load device connecting terminal; power switch means coupled between said power input and load device connecting terminals and operable to power circuit closing and opening conditions which respectively effect connection and disconnection of said power input and load device connecting terminals; the improvement in programmable means for automatically controlling the feeding of signals to said power switch means to operate the same between said power circuit closing and opening conditions, said programmable means comprising: storage means having respective storage locations assigned to various time intervals over a twenty-four hour period during which intervals said power switch means can be operated to either one of said conditions and in which storage locations there can be stored power turn-on or power turn-off markers, manually operable marker setting means operable to turn-on marker and turn-off marker setting conditions for generating marker setting or retaining signals which effect the placement or retension in a selected storage location in said storage means of a turn-on or turn-off marker, storage location selection means including a manually operable time interval setting member operable to discrete positions from a present time setting to other discrete positions representing all of said time intervals in a twenty-four hour period, permanently visible indicia along said time interval setting member to identify each of said timing intervals over a twenty-four hour period which each discrete position of said manually operable time interval setting member represents, means responsive to the advancement of said time interval setting member to each discrete position by generating a storage location accessing signal, means responsive to each storage location accessing signal to select a different storage location to record or maintain a marker therein which corresponds to the marker called for by the operated condition of said manually operable marker setting means, and control means including a repeat cycle synchronous storage location accessing and marker readout means for continuously operating said power switch means in accordance with the markers in the storage locations assigned to the timing intervals involved.

29. The timer system of claim 28 where said manually operable time interval setting member is a rotatable member.

30. The timer system of claim 28 wherein said control means is responsive to successive operation of said marker setting means for operating said power switch means between said power circuit opening and closing conditions so that said manually operable marker setting means also acts as an overriding power switch operating means operating independently of whether or not the marker in the storage location of the time interval involved calls for a given condition of said power switch means, and means, when said power switch means is left in a condition opposite to the condition called for by the marker in a storage location for the current time interval, for enabling a marker in a storage location for the following time interval calling for a change in the condition of said power switch means to control the power switch means only after at least one marker in a storage location for a following current time interval has corresponded to the actual circuit opening or closing conditions of the power switch means, and there is provided means for preventing the operation of said marker setting means from modifying the markers stored in said storage locations after said markers have been set or retained in all of said storage locations until a resetting operation is effected, and manually operable resetting means for effecting said resetting operation.

31. The timer or timer system of claim 1, 3, 10, or 28 wherein said storage means is a re-circulating multistage shift register in which said markers and the storage locations thereof are shifted in position each time interval, and said storage location accessing means accessing at various times different ones of said shift register stages to vary the time intervals when said power switch means is operated.

32. The timer of claim 28 or 30 wherein said manually operable time interval setting member is secured to a rotatable and momentarily depressible shaft spring urged to an outer position, and said manually operable marker setting means is a means responsive to depression of said shaft.

33. The timer of claim 28 combined with an enclosure assembly fitting over and in a wall switch opening which usually contains a toggle on-off switch and operating arm therefor; said enclosure assembly including a rear housing portion and a conventional switch plate with a toggle on-off switch operating arm-receiving slot, said switch plate overlying the front of said rear housing; said storage means, responsive means, and storage location accessing and marker readout means being located behind said switch plate and said manually operable time interval setting member and marker setting means include manually contacted means on the front of said switch plate which are coupled with other portions of the timer and control system through said switch plate slot.

34. The timer of claim 28 wherein there is provided timer program review means operable following the completion of the programming of the timer system by the setting or retension of markers in all of said storage locations for rendering inoperative said synchronous storage location accessing and marker readout means and asynchronously accessing said storage locations and operating said power switch means by the markers stored in the accessed location in accordance with the positioning of said time interval setting member.

35. The timer or timer system of claim 1 or 2 wherein the setting means in said reset condition interrupts the power fed to said timer system, and there is provided means for conditioning the timer to receive a new program when power is first fed to the timer.

36. A timer comprising: an enclosure assembly fitting over and in a wall switch opening which usually contains a toggle on-off switch and operating arm therefor, said enclosure assembly including a rear housing and a conventional switch plate overlying said rear housing and having a toggle on-off switch operating arm-receiving slot and at least a pair of screw-receiving openings of which at least one is free of any screws; indicating means on said rear housing visible through said one opening; electric circuitry in said rear housing, said circuitry including a pair of power input terminals, a pair of load device connecting terminals, power switch means coupled between said power input and load device connecting terminals and operable to power circuit closing and opening conditions which respectively effect connection and disconnection of said power input and load device connecting terminals; manually engageable means exposed on the front side of said switch plate and operable to programming conditions; means for connecting said manually engageable means through said switch plate slot with programming means forming part of said circuitry; and said circuitry further including control means including program-receiving means responsive to the operation of said manually engageable means during an initial programming period for establishing power switch turn-on and turn-off intervals in accordance with the operation of said manually engageable means, and means for effecting the automatic operation of said power switch means to said power circuit closing and opening conditions in accordance with the program set into said program-receiving means during a programming period, and said circuitry further including means for operating said indicating means so as to indicate a given condition of operation of said timer.

37. The timer of claim 36 wherein said means for operating said indicating means provides an indication which enables the operator to know the presence of the initial programming period.

38. The timer of claim 36 wherein said manually engageable means comprising separate controls respectively operating the power switch independently of the program receiving means and setting at least one timer condition setting function, and which separate controls are connected by separate mechanical means through said switch plate slot to said control means.

* * * * *